Oct. 31, 1944.　　　　　L. C. PORTER　　　　　2,361,497
BARRAGE BEACON
Filed March 16, 1942　　　　2 Sheets-Sheet 1

Inventor:
Lawrence C. Porter,
by John H. Anderson
His Attorney.

Oct. 31, 1944.  L. C. PORTER  2,361,497
BARRAGE BEACON
Filed March 16, 1942   2 Sheets-Sheet 2

Inventor:
Lawrence C. Porter,
by John H. Anderson
His Attorney.

Patented Oct. 31, 1944

2,361,497

UNITED STATES PATENT OFFICE 2,361,497

BARRAGE BEACON

Lawrence C. Porter, Cleveland Heights, Ohio, assignor to General Electric Company, a corporation of New York Application March 16, 1942, Serial No. 434,962

1 Claims. (Cl. 240—49)

My invention relates to the art of preventing observation of military or other objectives subject to bombardment. More particularly my invention relates to the art of preventing accurate observation from airplanes, or the like, of the exact location of military targets subject to bombardment.

The method of concealing objectives from observation at night by avoiding the use of visible light in the vicinity of the objective is successful only when light from the moon and stars does not illuminate the objective or its surroundings, and when atmospheric conditions, such as fog or mist, make the use of illuminating flares by the enemy ineffective. An object of my invention is to effectively prevent an observer from accurately locating objectives at all times. Other objects and advantages of the invention will appear from the following detailed description thereof and from the appended claims.

My invention consists in utilizing flashing, glaring light to dazzle the eyes of an observer to quickly produce a condition of extreme ocular fatigue. In accordance with my invention, a multiplicity of sources of flashing, glaring light are so disposed with respect to the objective and its surroundings that an observer is incapable of accurately locating the objective either with or without the aid of an apparatus intended to aim a missile at the objective. While my invention is particularly useful and effective for preventing accurate bombardment of objectives from airplanes or the like, it is also eminently satisfactory for preventing observation from any point from which the objective may be seen but for the use of the flashing, glaring light in accordance with my invention. Further, the glint from railroad tracks, the surface of water, or other light-reflecting objects which would be of assistance in locating the objective, cannot be perceived by an observer whose eyes are dazzled by such light.

Preferably, the sources are scattered over a substantial area of the terrain adjacent and contiguous to the objective. It is, of course, essential that any indication of the location of the objective within the area, either by the outline or contour thereof, or by the concentration of the sources, be avoided.

Figure 1:
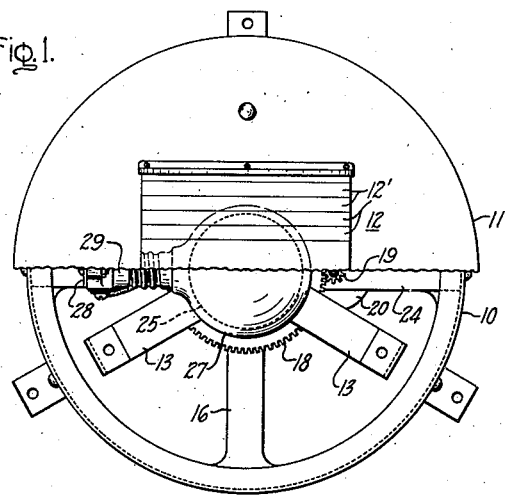
Figure 2:
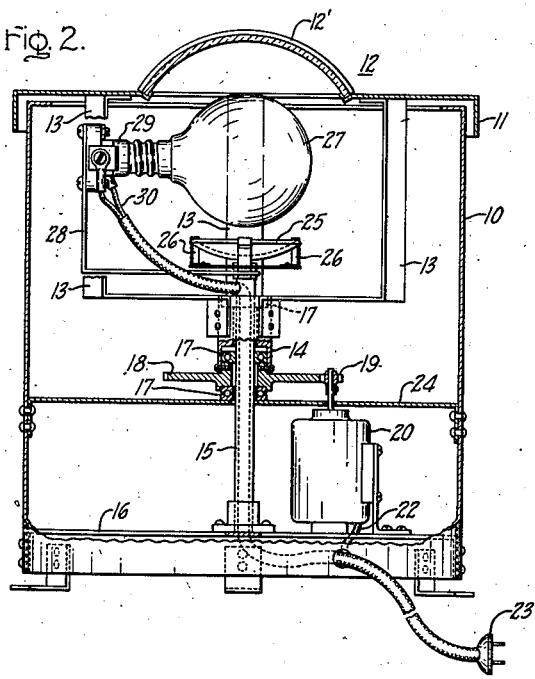
Figure 3:
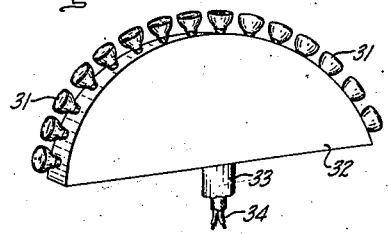
Figure 4:
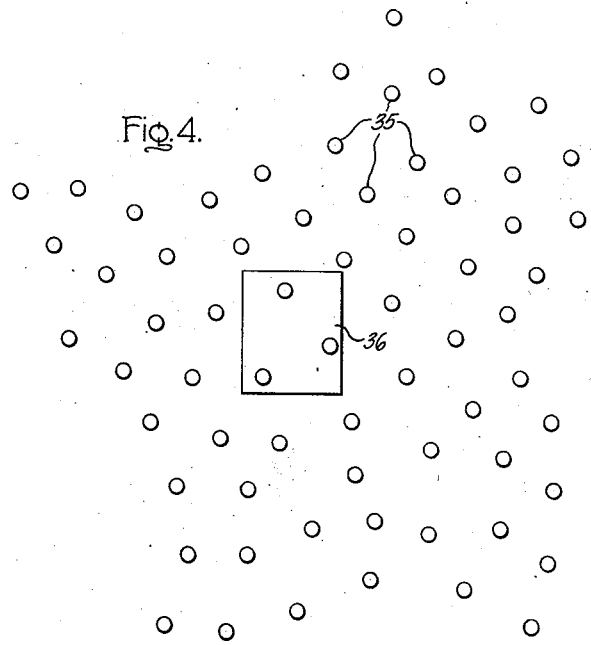

In the drawings accompanying and forming part of this specification, two species of light sources in the form of beacons capable of producing a flashing, glaring light effective for the purposes of the invention are illustrated, in which Fig. 1 is a top elevation of one type of beacon with part of the top thereof broken away; Fig. 2 is a side elevational, partly sectional view of the beacon shown in Fig. 1; Fig. 3 is a schematic representation in perspective of another type of beacon; and Fig. 4 is a schematic representation of an arrangement or system of beacons, such as those illustrated in Figs. 1 to 3, for preventing accurate observation of the location of a building from an airplane, or the like.

Referring to Figs. 1 and 2 of the drawings, the beacon illustrated comprises a cylindrical, light-tight housing 10 having a flanged cover 11 provided with a lens 12. The cover 11 is supported in spaced relation to the rim of the housing 10 by metal straps 13 securely fastened, as by rivets, welding, or the like, to said cover 11 and to a sleeve 14 mounted on hollow post 15 rigidly fastened to angle iron supports 16 attached to the bottom portion of the housing 10. Two spaced sets of ball bearings 17 facilitate rotation of the sleeve 14 around the post 15.

The sleeve 14 is secured to gear wheel 18 which meshes with the smaller gear wheel 19 fastened to the shaft of the electric motor 20. Said motor 20 is mounted on said angle iron supports 16 and is provided with current supply wires 22 which extend through the housing 10 and terminate in the contact member 23. When electrical energy is supplied to the motor 20 through plug member 23 and wires 22, the cover 11 and the lens 12 are rotated about an axis coincident with the axis of the post 15 and the sleeve 14. The lower bearing 17 for said sleeve 14 rests on support 24 bolted to the wall of housing 10.

A spherical mirror 25 is mounted on the end of the stationary post 15 which extends beyond the sleeve 14 and is removably secured thereto by three holding clips 26. The center of the spherical mirror 25 is coincident with the axis of rotation of the cover 11 and the lens 12.

An incandescent lamp 27 having a transparent envelope containing a filament disposed compactly about the axis of the lamp is interposed between the lens 12 and the mirror 25 so that the center of the spherical mirror 25 lies within and is surrounded by the space defined by the filament sections. The lamp is supported in the desired position by an angle member 28 secured to the top of post 15 and carrying a socket 29 for the screw base of the lamp 27. As shown in the drawings, the lamp 27 is mounted with the axis of the base thereof normal to the axis of rotation of the lens 12. The current leads 30 connected to the socket 29 pass through the post 15, out of the housing 10 and are connected to the member 23.

I prefer to use a 120° Fresnel lens 12 in this apparatus. As is well known, a Fresnel lens is of the condenser type having a plurality of prismatic steps for refracting the light from the source. The Fresnel lens 12 illustrated in Figs. 1 and 2 of the drawings is in the form of a segment of a hollow cylinder having a plurality of prismatic steps or sections 12' from the center to each end of the segment. The light from the lamp 27 and the mirror 25 is directed by the lens 12 in a fan shaped beam having its axis coincident with the axis of rotation of the lens 12.

I have demonstrated that the beacon described above produces a fan shaped beam of approximately 16,000 candlepower when a 500 watt lamp of the above type is used and a beam of approximately 28,000 candlepower when a 1000 watt lamp is used. A ratio between gears 18 and 19 such that the cover 11 and the lens 12 make approximately 75 complete revolutions per minute is preferred. The apparatus then produces 150 flashes of glaring light per minute on points of observation located between the axis of the beam and the outer limits thereof to dazzle the eyes of an observer. It will be understood, of course, that I contemplate changes in the gear ratio to produce a larger or smaller number of flashes per minute when service conditions of the device make such changes desirable.

The beacon illustrated in Fig. 3 of the drawings comprises a multiplicity of light projectors 31 mounted in a common plane on a rotating support 32. The light projectors 31 are arranged in a circular arc on the support 32 and preferably the beams emitted thereby overlap so that the beacon produces a fan-shaped beam of light useful for the purposes of the invention. An apparatus similar to that used for supporting and rotating the cover 11 of the beacon illustrated in Figs. 1 and 2 of the drawings may be used for rotating the support 32. Tubular support member 33 may then be secured to sleeve 14 or serve the same function. Small sized search lights may be used as light projectors. I prefer to use commercially available lamps of the type comprising an electrical energy translating element, such as an incandescent filament, and a reflector for directing the light from the filament in a beam, such, for example, as those shown in U. S. Patents 2,148,314 and 2,262,629 to D. K. Wright. Electrical energy for the lamps is supplied through wires 34 which are connected to a suitable power source through a conventional means, such as a liquid mercury containing vessel, for transferring energy from stationary contacts to moving contacts. The axis of rotation of the support 32 is coincident with the axis of the fan-shaped beam projected by the beacon.

Fig. 4 of the drawings illustrates an effective arrangement or system of beacons disposed on and in the vicinity of a building to prevent an observer from accurately locating the building. The beacons are represented by the circles 35 and the building by the square 36. As can be seen from the drawings, the arrangement is a haphazard one to avoid giving any indication of the size or shape of the building or of its location within the area over which the beacons are scattered. An observer trying to bomb the building from the air cannot perceive the latter due to the dazzling effect of the glaring flashes of light from the beacons.

What I claim as new and desire to secure by Letters Patent of the United States is:

A beacon comprising in combination, a cylindrical lens provided with longitudinal prismatic sections, a spherical reflector, a light source interposed between said lens and said reflector, said lens serving to direct the light from said source and said reflector in a fan-shaped beam, a support for said lens, said support having an axis of rotation coincident with the axis of said beam, and means to rotate said support about said axis whereby said beacon projects two flashes of light toward a given point located between the axis of said beam and the outer limits thereof during each revolution of said support.

LAWRENCE C. PORTER.